United States Patent [19]

Parkinson et al.

[11] Patent Number: 4,483,740
[45] Date of Patent: Nov. 20, 1984

[54] METHOD FOR RECOVERY OF REUSABLE CHEMICALS FROM ClO₂ GENERATOR EFFLUENT

[75] Inventors: John R. Parkinson; Richard E. Fuller, both of Bellevue, Wash.; Bruce Der, Richmond, Canada

[73] Assignee: A. H. Lundberg Associates, Inc., Bellevue, Wash.

[21] Appl. No.: 519,831

[22] Filed: Aug. 3, 1983

[51] Int. Cl.³ .............................................. B01P 1/00
[52] U.S. Cl. .................................. 159/47.3; 423/551; 23/302 T; 162/29
[58] Field of Search ................. 159/47.3; 162/29, 30.1, 162/30.4; 423/480, 551; 23/302 T; 210/737, 928

[56] References Cited

U.S. PATENT DOCUMENTS

| | | | |
|---|---|---|---|
| 2,970,890 | 2/1961 | James | 423/551 |
| 3,446,584 | 5/1969 | Fuller | 423/480 |
| 4,245,998 | 1/1981 | Okouchi et al. | 159/47.3 |
| 4,329,199 | 5/1982 | Anderson et al. | 423/480 |

FOREIGN PATENT DOCUMENTS 671118  4/1952  United Kingdom ............... 423/551

Primary Examiner—William Smith
Attorney, Agent, or Firm—Cole, Jensen & Puntigam

[57] ABSTRACT

Method for the recovery of acidic effluent from pulp mill chlorine dioxide generators using the Mathieson or Solvay system. The spent generator acid is directed through a three-stage evaporation/crystallization process in which spent acid from the generator is evaporated and crystallized to produce stage 1 sodium bisulfate crystals. The first stage crystals are then redissolved to form a second solution which is crystallized in order to yield stage 2 sodium sesquisulfate crystals and, finally, the second stage crystals are redissolved in a third stage evaporation/crystallization stage to yield sodium sulfate crystals. Besides salt cake, the system also produces reusable sulfuric acid for the chlorine dioxide generator. No chemicals are added during the recovery steps.

4 Claims, 1 Drawing Figure

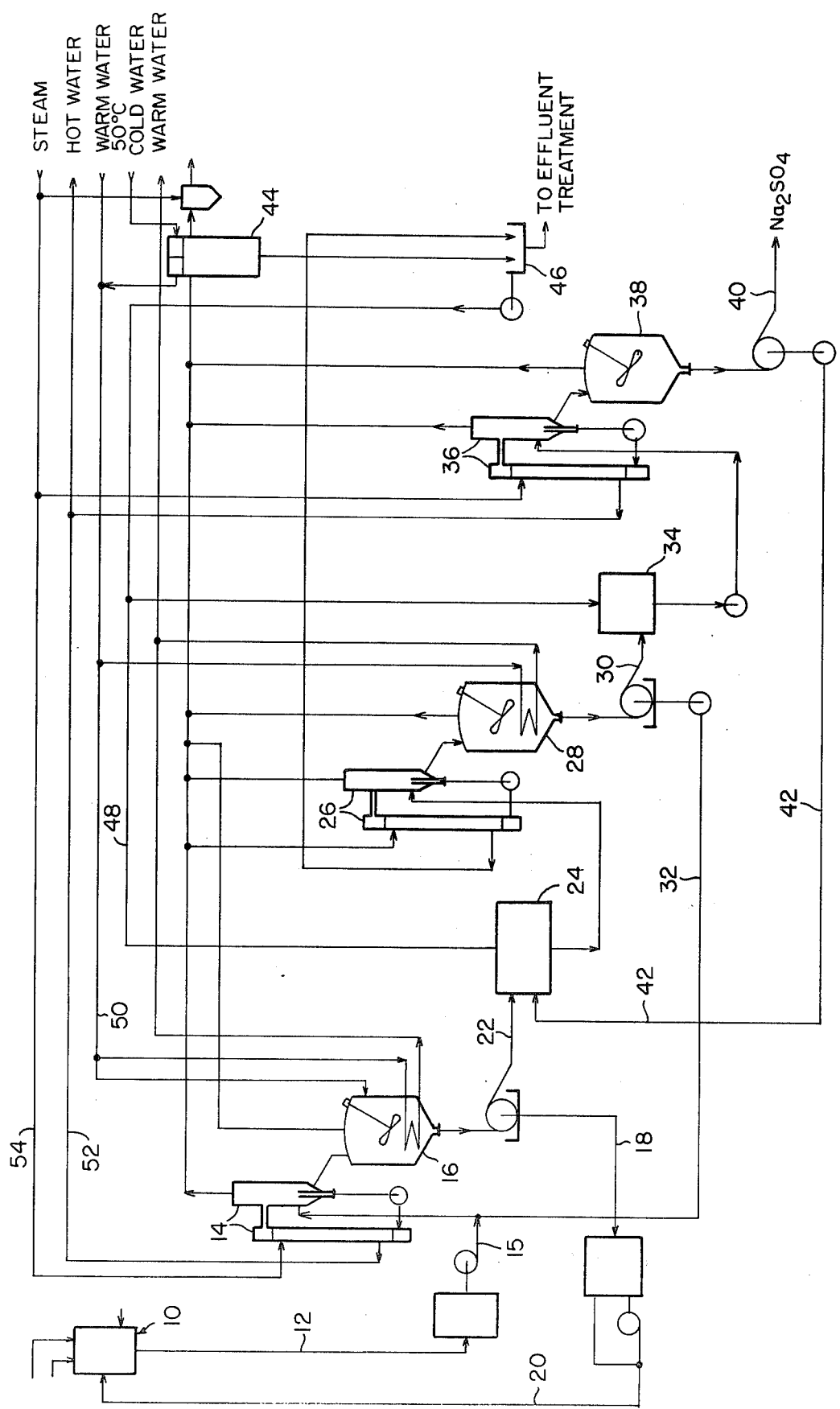

METHOD FOR RECOVERY OF REUSABLE CHEMICALS FROM ClO₂ GENERATOR EFFLUENT

BACKGROUND OF THE INVENTION

Process for the recovery of spent acid from a Mathieson or Solvay type chlorine dioxide generator and more particularly a process for the recovery of salt cake and reusable sulfuric acid from the effluent of a chlorine dioxide generator.

Those skilled in the art are aware that chlorine dioxide is used in the bleaching of cellulosic materials such as wood pulp produced by the Kraft or sulfite processes. It is also well known in the pulp and paper industry that the Hooker SVP and Erco R-3 systems offer an approach to the recovery of effluent from the chlorine dioxide generator by operating the generator under chemical conditions which favor precipitation of salt cake. The resystems have the disadvantage of generating significant quantities of chlorine gas which is dissolved in the chlorine dioxide and is harmful and damaging to the pulp.

On the other hand, the Mathieson or Solvay process does not produce chlorine gas but does yield an acid effluent which is difficult to dispose of since it cannot be dumped and to date, at least commercially, the acid effluent has not been successfully treated. Accordingly, the Mathieson or Solvay process for generation of chlorine dioxide is not used to any significant extent in the United States and Canada because of the environmental protection laws regulating the dumping of its effluent. As is also well known, recycling the ClO₂ generator effluent with the black liquor upsets chemical balances and values so that the Mathieson or Solvay system has fallen out of general use and favor worldwide.

It has been recognized in the prior art that in the evaporation and crystallization of the residual acid it is not only difficult but expensive to remove the sodium sulfate. However, while the industry is aware of the general chemistry involved, it has not developed a system for the purpose of disposing of the acid effluent in a closed system.

Among the prior art references known to applicants, only three would appear to be of interest. U.S. Pat. No. 4,329,199 is concerned with all of the environmental pollution substances for a pulp mill including black liquor, effluent from the bleaching operation, flue gases, condensate from the digester, and the like. This particular reference, however, does not direct itself to the process steps of this invention but simply mentions evaporation/crystallization steps and no more. The reference is considered to be of interest only for its recognition of the general chemistry.

U.S. Pat. No. 3,789,108 owned by Erco is directed to the production of chlorine dioxide. In this particular patent, a three-stage reaction zone for the production of chlorine dioxide involves the reacting of an alkali metal chlorate with alkali metal chloride and sulfuric acid to which in each of the generators air is introduced for removing chlorine. While the method of the Erco patent involves a three-stage operation for the production of sodium sulfate, its purpose is not to recover the acid effluent but to generate chlorine dioxide in each of the three stages. Accordingly, it adds sulfate ion-containing acidic material to all three of the stages.

Finally, U.S. Pat. No. 3,341,288 assigned to Hooker Chemical Corporation also is directed to the production of chlorine dioxide but does not concern itself with the acid effluent resulting from an Olin-Mathieson or Solvay type chlorine dioxide generating process.

Applicants are not aware of any other references at the time of filing this application that have any bearing on the steps of the instant application for the recovery of spent acid effluent in the form of salt cake and sulfuric acid.

DESCRIPTION OF PREFERRED EMBODIMENT

As will be observed from the drawing, the chlorine dioxide generator utilizes the conventional Mathieson system constituents of sodium chlorate, sodium chloride, sulfuric acid and sulfur dioxide in the reaction zone or generator 10. In the Solvay system, methanol is used in place of sulfur dioxide. Spent acid effluent from the generator is directed to the evaporator/crystallizer 12. It will be appreciated that the spent acid recovery system of this invention is based upon the solubility system of sulfuric acid-sodium sulfate-water. Depending upon the concentration of three inorganic chemicals, the excess salts present are precipitated out in the first stage as sodium bisulfate, in the second stage as sodium sesquisulfate and in the third stage as sodium sulfate. Water is internally evaporated, condensed and recycled within the system while the excess is either discharged or reused to dissolve incoming sodium chlorate as is shown in the flow chart.

In accordance with the present invention, three evaporator/crystallizers are operated in sequence, the conditions being somewhat different for the first stage as opposed to the second and third stages. In the first stage, effluent from the chlorine dioxide generator is directed via line 12 to the heater evaporator 14 where the spend acid is boiled at or above atmospheric pressure at approximately 128 C. in order to obtain first stage crystals. The spent acid solution is boiled to yield a weight reduction of approximately 40%. The solution is then transferred to the crystallizer tank 16 where it is cooled. Crystallization commences between 98 degrees to 103 degrees C. The slurry is cooled to 60 degrees C. and held at that temperature for approximately 3 hours in order for the solution to reach equilibrium. The crystals were analyzed and found to have a Na/SO₄ ratio of 0.26 which is indicative of NaHSO₄. X-ray diffraction analysis performed on a sample of the crystals confirmed the presence of $NaHSO_4$ and $NaHSO_4:H_2O$, the latter of which may have formed as a result of subsequent hydration of the sodium bisulfate. The crystals were also observed by a scanning electron microscope.

The crystals and filtrate are separated with the filtrate going via lines 18 and 20 back to the ClO₂ generator. The crystals were transferred to the holding tank 24 and consisted of 59.2% sodium sulfate and approximately 40.8% sulfuric acid.

At holding tank 24 the crystals are redissolved and transferred to the second stage heater evaporator 26 with the solution containing 39.2% sodium sulfate, 26% sulfuric acid and 34.8% water. The solution in the stage 2 evaporator is heated to 63 degrees C. under a partial vacuum of 673 mm Hg to induce evaporation. The crystals formed were found to have a Na/SO₄ ratio comparable to $Na_3H(SO_4)_2$. The stage 2 crystals transferred to the holding tank 34 via line 30 were approximately 81.3% sodium sulfate and 18.7% sulfuric acid.

The stage 2 crystals transferred to holding tank 34 are then redissolved and heated to 85 degrees C. under 673 mm Hg vacuum. It was found that a lower temperature at this stage resulted in too slow a reduction of volume.

After cooling, the crystals were analyzed to have a Na/SO$_4$ ratio comparable to sodium sulfate. The saltcake is then transferred to its point of use while the filtrate is transferred via line 42 to the holding tank 24 at stage 2. The filtrate from stage 2 via line 32 is transferred to the stage 1 heater evaporator 14 along with original effluent from the generator 10 via lines 12 and 15.

Reusable salt cake was obtained from the spent acid effluent as set forth. The crystals formed in all three stages contained no significant traces of iron or chromium which indicates the recycled acid will contain any impurities introduced in the system.

What is claimed is:

1. A closed system method for the recovery of reusable sodium sulfate and sulfuric acid out of the aqueous acidic effluent from the generator of chlorine dioxide comprising the steps of:
   a. directing said acidic effluent from the generator for the ClO$_2$ to a first stage evaporator/crystallizer in which said acidic effluent is heated to yield a weight reduction of a predetermined amount and then cooled to effect crystallization of first stage sodium bisulfate crystals which are then separated from the remaining first stage acidic filtrate,
   b. recycling the first stage acidic filtrate back to said chlorine dioxide generator and dissolving said first stage sodium bisulfate crystals in H$_2$O to create a second stage solution for a second stage evaporator/crystallizer and heating said second stage solution to a prescribed temperature under a partial vacuum for a predetermined period of time to reduce the solution volume and then cooling said solution in the crystallizer to produce second stage sodium sesquisulfate crystals from which the second stage acidic filtrate is separated and recycled to said first stage evaporator/crystallizer, and
   c. dissolving said second stage sodium sesquisulfate crystals in water to create a third stage solution for a third stage evaporator/crystallizer and heating said third stage solution to a prescribed temperature under a partial vacuum for a predetermined period of time to reduce the solution volume and then cooling said third stage solution to produce third stage sodium sulfate crystals from which the third stage filtrate is separated and recycled to said second stage evaporator/crystallizer, and wherein said recovered sodium sulfate crystals may be recycled for use in said chlorine dioxide generator.

2. The closed system method for the recovery of sodium sulfate and sulfuric acid according to claim 1 and wherein in said first stage said acidic effluent is heated to a temperature of approximately 128 degrees C. at or above atmospheric pressure to effect said weight reduction.

3. The closed system method for the recovery of sodium sulfate and sulfuric acid according to claim 2 and wherein said second stage solution is heated to a temperature of approximately 63 degrees C. under a partial vacuum of about 673 mm Hg for a period of approximately 45 minutes.

4. The closed system method for the recovery of sodium sulfate and sulfuric acid according to claim 3 and wherein said third stage solution is heated to a temperature of approximately 85 degrees C. under a partial vacuum of about 673 mm Hg for a period of about 45 minutes.

* * * * *